| United States Patent Office | 3,169,201 |
|---|---|
| | Patented Feb. 9, 1965 |

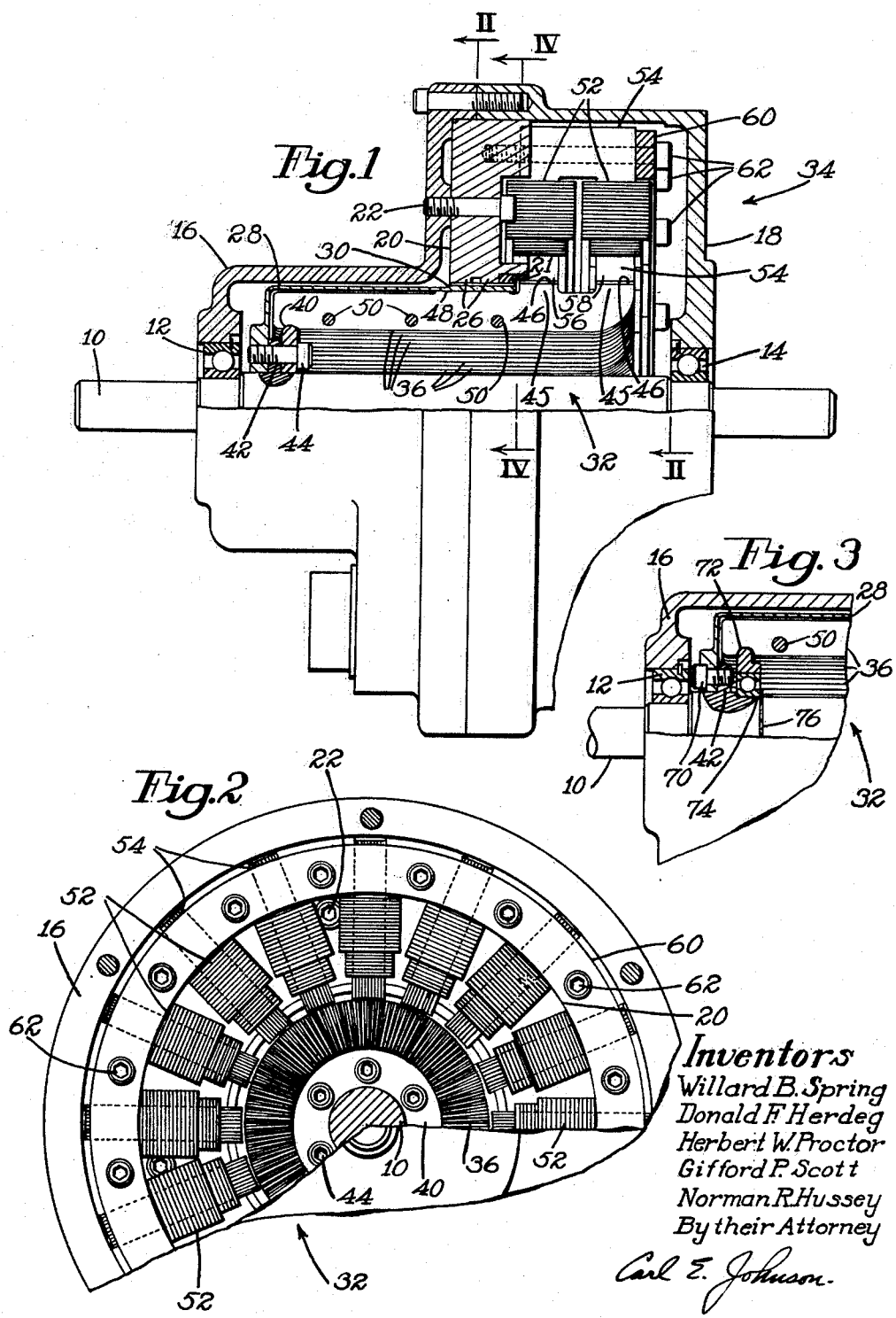

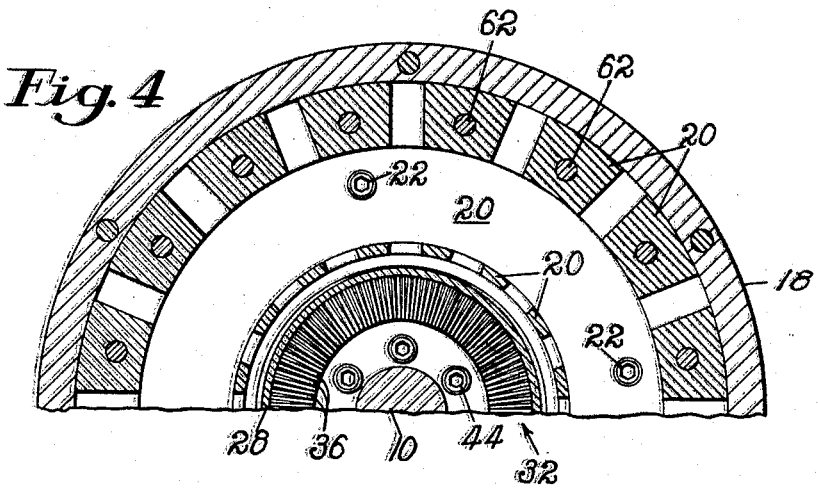
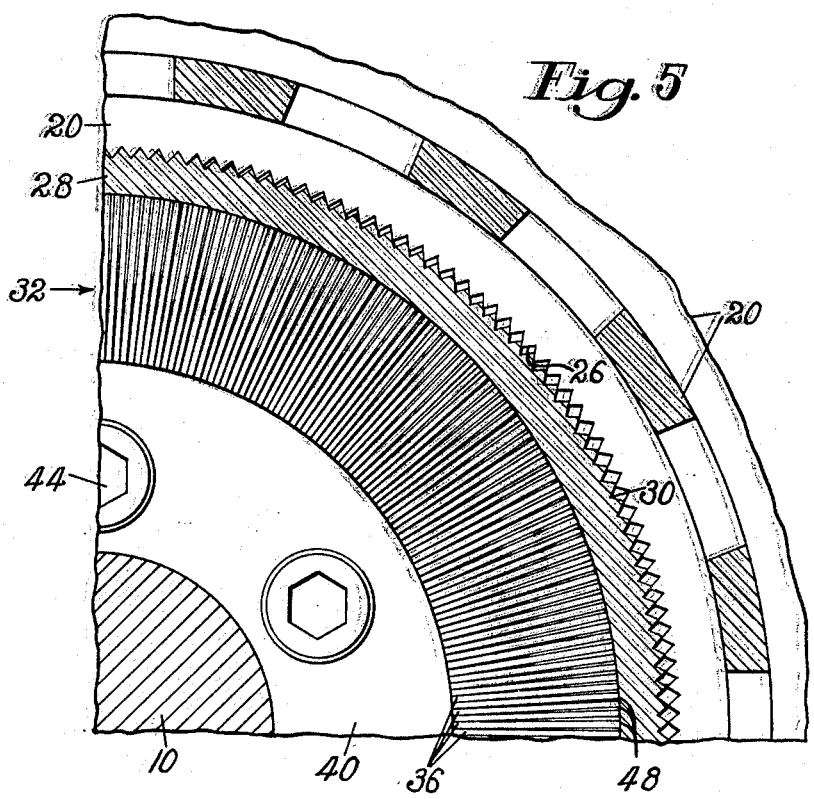

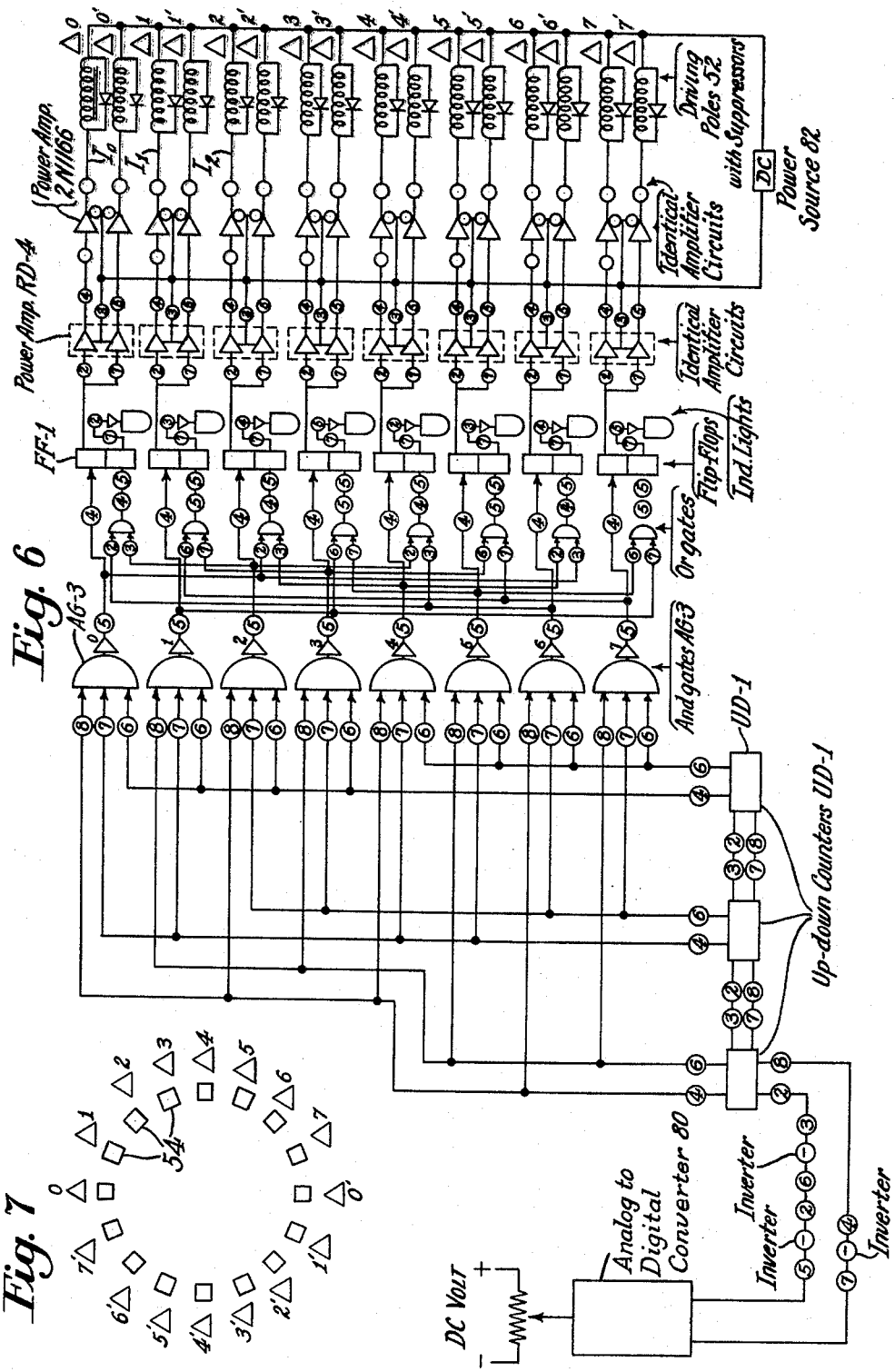

3,169,201
ELECTROMAGNETIC HARMONIC DRIVE
Willard B. Spring, Topsfield, Donald F. Herdeg, Beverly, Herbert W. Proctor, Danvers, Gifford P. Scott, Beverly, and Norman R. Hussey, Amesbury, Mass., assignors to United Shoe Machinery Corporation, Flemington, N.J., a corporation of New Jersey
Filed Feb. 15, 1963, Ser. No. 258,707
19 Claims. (Cl. 310—83)

This invention relates to the provision of improved electromechanical rotary drive systems. More particularly it pertains to electromagnetically actuated devices employing elastic body mechanics and may, for instance, include strain wave gearing which is often referred to as "harmonic drive." While the invention is herein illustrated as embodied in a stepping field actuator including a rotary-to-rotary type of harmonic drive assemblage, it is to be recognized that in various aspects application of the invention is not necessarily thus limited, and is not even restricted to an embodiment wherein the driving and driven members are formed with cooperating teeth.

Harmonic drive transmissions have hitherto normally comprised three coaxial operating elements, namely a ring gear, a flexible tubular gear cooperating therewith, and a wave generator commonly in the form of a rotary cam progressively deflecting the flexible gear to provide an output in one of the gears. Such assemblies have many advantageous applications in that they feature, for instance, compactness, low weight to output ratio, and very little back lash. Moreover such units are particularly well adapted to provide hermetically sealed actuators useful in outer space conditions. As disclosed, for instance, in United States Letters Patent 2,906,143 issued September 29, 1959, in the name of C. W. Musser, harmonic drive may be actuated in different ways. One of those then broadly conceived was to employ electromagnetism for circumferentially propagating the required continuous wave of radial deflection in one of the rings of the gearing combination. That patent accordingly shows diagrammatically the general idea of using single or polyphase circuitry for energizing electromagnets for producing a traveling electromagnetic wave acting on a flexible ring. So far as known, no harmonic transmission thus energized has ever previously been constructed and actually operated to perform useful service.

More recently it has been recognized that elimination of the wave generator cam and its bearing together with elimination of an input shaft connected thereto, and substitution therefor in a harmonic drive type assembly of an integrally contained, appropriately designed magnetic power source, would provide a unique actuator preserving many of the valuable characteristics of conventional harmonic drive, and having such reduced inertia that its acceleration capability or power rate (ratios of torque-squared to inertia) would far exceed such performance in presently available devices. Integration of electromagnetics and elastic body mechanics has now proven, for instance, that it is possible to obtain in a low power device the power characteristics hitherto only obtainable in rather high power electrical actuators, a fact of great importance to servo actuation.

In view of the foregoing it is an object of this invention to provide, in a drive system including a flexible, annular member and a reaction member cooperative therewith, an improved electromagnetically controlled wave generator input means for effectively progressing deflection circumferentially in the flexible member whereby an output in one of the members is actuated with high response. To this end, and in accordance with a novel feature of the invention, a transmission in one embodiment shown herein comprises, in combination with a tubular flexspline and telescoping circular spline, an input means including a plurality of elements distributed around the side of the flexspline remote from the circular spline and mounted for relative radial displacement, and electromagnetic means adapted to be energized to act radially and progressively on the elements for thereby deflecting the flexspline into ellipsoidal shape whereby the flexspline teeth at the locality of the major axis engage with the teeth of the circular spline, and these localities of engagement are circumferentially propagated to rotate one of the circular spline and flexspline as output. More specifically, as herein shown in an optimum construction affording high acceleration capablity and good wear-life, the invention provides in combination, within a stationary, harmonic drive circular spline having internal teeth, a coaxial flexible spline formed with external teeth differing in number from the internal teeth and arranged and adapted to be deflected into spaced engagements with the internal spline teeth, an output shaft to which the flexspline is coupled at an axial position remote from its teeth, and electromagnetically actuated wave generator means for progressively effecting the radial tooth deflections circumferentially, the wave generator means including a novel rotor comprised of a circular series of non-retentive laminations axially disposed within the flexible spline, each of the laminations being pivotally supported at one end thereof, having their other ends, respectively, formed and arranged to be attracted by electromagnetically exerted torque, and having an intermediate deflecting portion bearing on the flexible gear on the opposite side thereof from its teeth, and controllably pulsed magnetic circuit means for sequentially acting on diametrically disposed ones of the mentioned other lamination ends. As herein shown for purposes of providing a reversible stepping motor, the circuit means preferably includes a transistorized bistable logic arrangement whereby diametrically opposed electromagnetic stator coils are energized in clockwise or counterclockwise order.

While the electromagnetically actuated rotor is herein shown in a ring-like, axially disposed, laminated lever arrangement, it being well adapted to a stepping-field type actuator wherein a digital control circuit may provide for over-lapping the energizing of the poles to produce smoother torque, it is appreciated that other forms of electromagnetic rotor construction may be substituted. Three alternative rotor constructions, for example, are disclosed in a copending application, Serial No. 258,734, filed concurrently herewith in the names of Herbert W. Proctor, Donald F. Herdeg, Willard B. Spring, Hugh A. Robinson, and Gifford P. Scott, these alternate rotors also having special merit when acted on by wholly different circuitry, namely a continuous or rotating electromagnetic field wherein there is basically only one closed loop of flux. In any of these drive systems incidentally, it is found that the provision of interacting tooth or spline means is usually desirable, though for some applications it has been ascertained that interacting teeth or splines as such may be eliminated and adequate frictional drive derived at a uniformity that suffices.

The above and other features of the invention, together with various novel details of construction and arrangement of parts, will now be described with greater particularity in connection with illustrative embodiments thereof, and with reference to the accompanying drawings, in which:

FIG. 1 is a view in side elevation and partly in axial section of a stepping field, low inertia actuator, the parts being shown in non-energized conditions;

FIG. 2 is a vertical section, with portions broken away, taken on the line II—II in FIG. 1, further showing the relationship and mounting of stator coils, and an electromagnetic wave generator rotor responsive to energization of the coils;

FIG. 3 is a fragmentary view corresponding to a portion of FIG. 1, but showing a form of the invention wherein the wave generator rotor may be held against rotation or be freely rotatable on the output shaft;

FIG. 4 is a vertical section taken on the line IV—IV of FIG. 1, but modified to illustrate a simpler, more economical, "toothless" construction in which frictional drive is attained by electromagnetic energization of the stator;

FIG. 5 is an enlarged sectional view corresponding for the most part to the right half of FIG. 4, but now indicating electromagnetic wave generator deflection of flexspline teeth shown in FIG. 1;

FIG. 6 is a schematic wiring diagram of counting type electronic circuitry for controlling the sequence and rate of stator energization;

FIG. 7 is a diagrammatic view of the stator pole energizing schedule;

Figure 8:
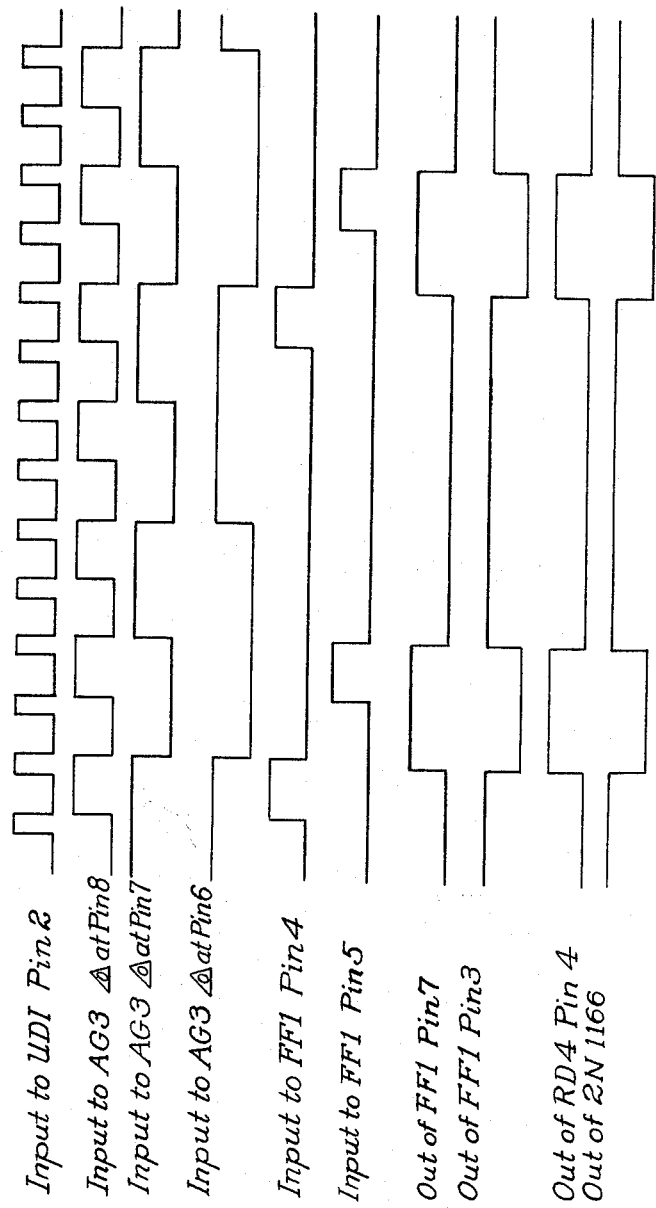
FIG. 8 is a chart showing the forms of pulse trains at a few selected points or terminals indicated in the circuit of FIG. 6 and associated with only one pair of driving poles.

Referring to FIGS. 1 and 2, an output shaft 10 is journaled in axially spaced bearings 12, 14 respectively mounted in complementary housing parts 16 and 18 preferably of aluminum. For holding a reaction or circular spline 20 (FIG. 1) against relative rotation, it is secured to the part 16 by circularly disposed bolts 22, and the housing is provided with mounting bores 24 (one only shown in FIG. 1) for receiving anchor bolts. An oil-filled felt ring 21 may be fitted into a groove of the spline 20 if necessary or desirable. In the arrangement of harmonic drive herein shown, the member 20 is formed with internal spline teeth 26 coaxial with the shaft 10, and a rotatable tubular flexspline 28 concentric therewith is disposed within the circular spline. Adjacent to its open end the flexspline has its axial spline teeth 30 formed externally for cooperating with the teeth 26. As in prior mechanical harmonic drives there preferably is a tooth differential, the number of teeth on the inner member, i.e. the flexspline in this case, being less by two or a multiple thereof when deflection to elliptoidal shape is practiced. In the embodiment of FIG. 1 there may be, for instance, 312 circular spline teeth and 310 flexspline teeth. For radially deflecting the flexspline teeth to elliptoidal configuration, and for propagating circumferentially the resulting wave of radial deflection so as to advance the localities of tooth interengagement (and hence the intervening localities of non-engagement), a novel electromagnetically actuated wave generator requiring no rotary input member is provided, as will next be described. This wave generator consists in a composite rotor generally designated 32, and an electromagnetic stator generally designated 34 for sequentially acting radially on the rotor.

The rotor 32 is comprised of a circular series of conductive laminations 36 extending axially and distributed around the side of the flexspline remote from the circular spline. Preferably, the laminations 36 are of magnetically non-retentive material, such as Vanadium Permendur, having exceptionally high saturable flux density each lamination being coated with a suitable non-conductive substance. The laminations may be stampings having a thickness on the order of .014". They are pivotally supported at one end where they are transversely grooved to receive a fulcrum ring 40 (FIG. 1), preferably of non-conductive material. This ring is secured to a collar 42 integral with the output shaft 10, clamping bolts 44 extending through the ring and collar for threading into bores formed in the flanged mounting end of the flexspline 28. The other ends of the laminations 36 are formed and arranged with protrusions as at 45, 45 to be attracted and radially displaced, in this case outwardly, by the stator during its sequential energization. Accordingly, these protruding outer end portions of the laminations 36 are respectively adapted to serve as a magnetic circuit portion and have axially spaced, non-coated external faces 46 protruding outwardly. Intermediate, outwardly protruding portions 48 of the laminations are arranged, when displaced during operation, to bear on the inside of the flexspline 28 opposite to its teeth 30.

In order to sustain the individual laminations against lateral buckling and yet permit their independent radial operating displacement upon controlled energization of the stator as later explained, at least one (in this case 3) non-conductive harness or flexible band 50 of rubber, or the like, extends transversely through a plurality of the laminations. To facilitate assembly, a complete band in a general plane normal to the shaft 10 may actually consist of two or three or more non-connected band sections which may circumferentially overlap.

As herein shown (FIGS. 1 and 2), the stator 34 is preferably comprised of sixteen pairs of evenly spaced solenoid coils 52 disposed circularly. The coils of each pair are wired in series. These are mounted on the legs of sixteen U-shaped cores 54 which, as indicated in FIG. 2, are laminated and have pole faces 56, 58 to confront rotor lamination faces 46. In the illustrative construction each pole face diametrically is approximately .400" and corresponds to about 28 rotor laminations. For securing the cores against relative movement in the housing, a clamp ring 60 receives bolts 62 which extend between adjacent cores and are threaded into the circular spline 20.

It will be understood that where an actuating device of the type being described is intended or required to handle greater loads, there may be, in addition to a larger external stator of the type described above, a stator internal to the laminations 36, the internal stator then being energized approximately 90° out of phase with the external stator, and, if desired, having a lesser number of cores.

As indicated in FIG. 3 the rotor 32 need not necessarily contribute even its small inertia by being secured to the output shaft, but may be held against rotation (by means not shown) or simply allowed independently to rotate freely at its own speed, if any. In this latter arrangement the flexspline 28 is secured by bolts 70 (one only shown in FIG. 3) to the collar 42 and a fulcrum ring 72, on which the laminations 36 are pivoted, is mounted on a bearing 74. This bearing may be held against axial movement in one direction by a retaining ring 76. It will be understood that the elliptoidally deflected shape electromagnetically imposed on the laminations 36 will rotate synchronously with the flexspline 28 even though they themselves do not in this construction.

Referring to FIG. 4, a "toothless" or rolling friction type of electromagnetic actuator is illustrated, the construction being similar to that of FIG. 1 except for the omission of circular spline teeth 26 and flexspline teeth 30 which are shown in FIG. 5. As would be expected, there is a decrease in operating efficiency when splines are not provided to assist with leverage by affording "fixed pivots" or meshing, but there is also less expense in manufacture, and performance is adequate for numerous applications. A further advantage attainable in the non-toothed construction, also to be had in the splined construction when economically and/or greater compactness are desired, is that the circular reaction member or circular spline may be made integral with the housing.

Essentially, as with prior mechanical wave generators, the electromagnetic wave generator produces controlled radial deflection of the normally circular flexspline, to elliptoidal shape as shown herein, and propagates this shape circumferentially. Accordingly, for providing a stepping or digital type actuator, the diagonally opposite pairs of solenoid coils 52, 52 are independently energized in sequence circumferentially by suitable control means, as will next be briefly described by way of example with reference to the transistorized logic circuit diagrammatically shown in FIG. 6, and the schematics of FIGS. 7 and 8. It will be appreciated that the number of pole pieces 54 may differ from sixteen but that this number is selected for illustration since (1) it is the smallest even number found to yield fairly smooth performance in a small type actuator, and (2) it is well adapted to the control circuit shown which is versatile and compatible with common servo systems that use proportional analog control. For designating the schedule or order of their energization, the pairs of diametrically opposite coils 52 are labeled as indicated in FIGS. 6 and 7, i.e., 0 and 0', 1 and 1', 2 and 2', etc. thru 7 and 7'. In the illustrative circuit input control is positive or negative voltage, the sign determining the sequence of energization and hence the direction of rotation of the rotor shape and of the output shaft 10. The speed of the rotor shape and of the output are proportional to input voltage magnitude. The device may be operated at variable speed or stalled. In the latter condition the major axis of the elliptoidal shape of the flexspline adjusts itself at an angle to the resultant force vector of the flux at the energized cores 54 such that the holding torque requirement is met. During rotation torque greater than the holding torque load is produced in steps by a series of pulses that advance the resultant force vector, the rate of advance in this case being determined by electronically controlled input pulse repetition rate. An analog to digital convertor 80 (FIG. 6) is coupled to input where it is desired to utilize linear analog signals, a pulse train with frequency proportional to the amplitude of the analog signal being produced. As shown in FIG. 6 the D.C. power input circuit consists of two complementary NPN-PNP transistor circuits connected in common base configuration for determining polarity. The conducting transistor is connected to charge a capacitor (not shown as such) which in turn triggers a one-shot multivibrator of an inverter unit (designated in FIG. 6) at a predetermined voltage level. The 2-channel, polarity-sensitive pulse trains then drive a 3-stage up-down counter chain. In this case, up-down counters UD1 are interconnected to a series of eight "And" gates AG3 to develop eight sequential signal paths controlling energization of the eight coil pairs, 0, 0'; 1, 1' etc. These paths are connected, respectively, to eight flip-flops FF1 which are gated, respectively, to drive output power transistors (as FIG. 6 schematically shows) having connection to the opposed coil pairs and their poles 54 as loads driven in parallel. A suitable D.C. power supply 82 furnishes the current to the coils 52. Except for the short switching period when two opposed poles 54 are being switched in and concurrently two poles are being switched out, there preferably are four poles switched in across the power supply. Although not shown in FIG. 6 in order to preserve simplicity of the drawing, it will be understood that an additional D.C. power supply is provided to supply the positive and negative voltages, respectively, required by the transistors in operating alternately above and below zero volts in the logic circuitry.

Figure 9:
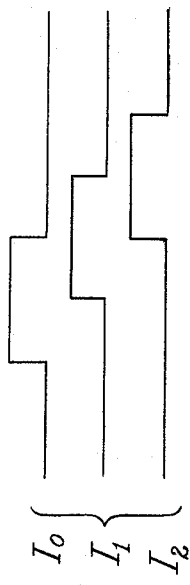
FIG. 9 is a graph showing the manner in which the energization of a stator coil overlaps that of the coil ahead of and behind it.

For smooth performance an overlapping of energization of at least two adjacent poles is desirable, and this is attained independently of the input signal. Accordingly in the control system shown the turning on of the flip-flops FF1 is determined by the corresponding "And" gate AG3 signal, while turning off of the respective flip-flops is accomplished by their connection through a series of "Or" gates (FIG. 6) to the pole two steps behind, in time, independent of the sequence, i.e. independently of the direction of rotation. Thus, for instance, energizing of the pole 4 by "And" gate 4 would also turn off or deenergize the pole 2 or 6, depending upon which of the latter was then energized. The "Or" gates merely prevent false signal paths inadvertently turning on other poles by insufficient isolation of turn-on and turn-off functions. The energization of any three successive coils may have overlapping relation as indicated in FIG. 9. FIG. 8 indicates the wave shape at certain selected points in the circuitry associated with only one pair of driving poles 52; this sequence would be identical for each of the other poles, but uniformly spaced in time at discrete intervals determined by the input pulse train for the particular predetermined sequence of energization. It will be understood that pole energization is sequential to correspond with angular physical positions of the coils.

From the foregoing it will be appreciated that various arrangements of the electromagnetic harmonic drive elements may be provided without departing from the scope of this invention. Basically in each case, as exemplified by the embodiment illustrated herein, linear motion reluctance motor type forces are converted by harmonic drive type principles in an organization that is compact and capable of bi-directional operation and at high values of torque-squared to inertia. Associated electronic control circuitry in each case will influence attainable output speed, the frequency of magnetic field rotation being rigidly related to the output. By omitting any rotary input member, such as the conventional harmonic drive, shaft-mounted cam, and employing a stator 34 having a rotary field effectively to "deform" an armature and thereby correspondingly impose progressively an elastic, lobar shape on the tubular output member 28, a long-life drive with high response characteristic, high resolution, and unusually low inertia is achieved. The armature "deformation" in this case elliptoidal, opposed laminations 36 moving radially, as energized, only a small distance and bringing a mechanical advantage to bear on the member 28 to deflect it. Thus the armature 32 itself need not rotate at high speed and does not significantly contribute to inertia of the device.

Having thus described our invention, what we claim as new and desire to secure by Letters Patent of the United States is:

1. An actuating device comprising, in relatively rotatable and telescoping relation, an annular member and a flexible tubular member coaxial therewith, the flexible member being deflectable into elliptoidal shape for engagement in the localities of one of its axes and non-engagement at intermediate localities with said annular member, and wave generator input means for effecting said shape and for circumferentially propagating said localities of engagement whereby one of the members is rotatably driven with respect to the other, the wave generator input means including a plurality of magnetically responsive, radially acting elements distributed around the side of the flexible member remote from the annular member, and a stator consisting of a circular series of electromagnets for radially displacing said elements, the electromagnets being energizable sequentially to provide a plurality of substantially closed loops of flux to control the rotation of said driven member.

2. In an electromagnetic actuating device of the type having a stationary annular member, and a flexible, tubular output member concentrically mounted within the annular member for controlled rotation about their common axis, the combination of means magnetically displaceable radially for deflecting circumferentially spaced points of the flexible member into engagement with the inner side of the annular member, a circular series of solenoid coils operable on said displaceable means, and means for sequentially energizing the coils for controlling rotationally the advance of the points of engagement of the output member.

3. A device as set forth in claim 2 and further characterized in that the coils are arranged in stationary pairs, the tubular and annular members are each formed with circularly disposed, cooperative spline teeth, and the diametrically disposed pairs of said coils are energizable sequentially whereby said magnetically displaceable means is effective to create a rotary major axis in the tubular output member and to cause the spline teeth in the vicinity of the major axis of said tubular member progressively to engage and mesh with the spline teeth of said annular member.

4. A device as set forth in claim 2 wherein said displaceable means comprises a generally circular series of axially disposed laminations within the flexible output member, each of the laminations being pivotally supported in one portion, adapted in another portion to be acted upon by the magnetic attraction of said coils and thus sequentially swung outwardly, and formed in a third portion to bear upon the inside of the output member at a locality opposite to its points of engagement with said annular member.

5. A high response rotary actuator comprising a stator consisting of a plurality of circularly disposed solenoid coils and cores, an output shaft mounted coaxially therewith, a tubular flexspline having spline teeth and extending axially from the stator and coupled to the shaft at a locality axially spaced from said cores and from the spline teeth of the flexspline, a circular reaction spline provided with teeth and mounted for cooperative engagement at circumferentially spaced points with the flexspline teeth, a rotor including a circular series of fulcrumed elements arranged to be sequentially moved radially to engage the flexspline and deflect the flexspline teeth into engagement at said circumferentially spaced points with the circular spline and to advance these points, the fulcrumed elements being individually responsive to energization of the coils to exert leverage on the flexspline, the fulcra of the elements being axially spaced from the cores, and control circuit means connected to the coils for determining the rate and direction of their sequential energization.

6. An actuator as set forth in claim 5 wherein said stator cores are disposed in pairs axially arranged and have their pole faces adjacent to magnetic circuit portions, respectively, of a series of said fulcrumed elements.

7. An actuator as set forth in claim 6 wherein said pole faces are axially closely adjacent to said teeth of the circular reaction spline.

8. An actuator as set forth in claim 5 wherein said rotor elements are axial, non-retentive laminations having their fulcra proximate to said locality of the coupling of the flexspline and output shaft, the laminations extending beyond said spline teeth of the flexspline to provide magnetic circuit portions closable on said cores.

9. An actuator as set forth in claim 5 wherein flexible non-conducting means is provided for circumferentially interconnecting said fulcrumed elements to assist them against buckling while permitting independent operating movements.

10. An actuator as set forth in claim 5 wherein said rotor is connected to the output shaft in the vicinity of the fulcra of said elements for synchronous rotation with the output shaft.

11. An actuator as set forth in claim 5 wherein said rotor is mounted on a fulcrum ring, and the latter is journaled on said output shaft for independent rotation thereon.

12. An electromagnetic harmonic drive comprising a housing, an output member journaled therein, a circular spline secured to the housing, a cup-shaped flexspline coaxial with the circular spline and said output member, the flexspline being secured at its closed end to the output member and having a side at its open end formed with spline teeth arranged to be radially deflected for spaced circumferential engagement with the circular spline, and electromagnetic means for controlling deflection of the flexspline to elliptoidal shape and propagating said spaced localities of spline tooth engagement circumferentially, said means including a plurality of diametrically opposed, U-shaped stator poles secured to the housing for operation near the open end of the flexspline, a generally circular series of radially displaceable elements respectively extending axially and having a deflecting portion adjacent to the side of the flexspline remote from its teeth and a magnetic circuit portion adapted to bridge and be attracted by said poles, and a control circuit for sequentially energizing the opposed poles to step their magnetic fields whereby the elliptoidal flexspline shape and hence said output member are rotatably driven.

13. A drive as set forth in claim 12 wherein said stator poles are laminated, their pole faces are axially spaced and radially disposed externally of said series of elements, and said circuit is of an electronic counting type for determining the sequence of pole energization by input pulse repetition rate.

14. A drive as set forth in claim 12 wherein the control circuit is adapted to effect overlapping of the energization of at least two consecutive adjacent ones of said diametrically opposed pairs of poles.

15. A drive as set forth in claim 12 wherein said control circuit includes means for deenergizing one of three consecutive opposed pairs of poles when the opposed pair two poles in advance is being energized.

16. A low inertia harmonic drive comprising a stationary internal ring gear, a coaxial tubular output member having a toothed portion radially deflectable into cooperative engagement with said gear at diametrically spaced peripheral points, and electromagnetic wave generator input means for controlling the advance of said spaced points circumferentially, said input means including a circular series of sequentially energizable solenoids evenly spaced about said member, said solenoids being fixedly mounted in diametrically opposed positions, a composite rotor having a plurality of relatively movable conductive elements dielectrically separated and disposed coaxially within the member, said conductive elements respectively having a portion arranged to abut the output member to effect deflection of its toothed portion to elliptoidal shape in response to the effective magnetic fields of said solenoids, and a circuit connected to the solenoids for determining the sequence and strength of their fields whereby the direction and speed of the output member are controlled.

17. The harmonic drive of claim 16 wherein said circuit includes pulse repetitive means for reversibly stepping the energization of the solenoids.

18. For use in a harmonic drive assembly the combination, with a fixed circular spline and an output flexspline having a toothed portion cooperative therewith at its major diameter, of an electromagnetic wave generator input means for circumferentially propagating a wave of radial deflection in the toothed portion of the output flexspline, said means including a circular series of magnetically responsive elements arranged to bear sequentially at different points on the flexspline to impart an elliptoidal shape to its toothed portion, and diametrically opposed magnetic circuit means respectively having flux paths coincident with portions of said magnetically responsive elements.

19. The combination as set forth in claim 18 further characterized in that said elements are axially disposed laminations respectively separated dielectrically, and fulcrum mounting means is provided for the respective laminations whereby they are enabled independently to serve as flexspline deflecting levers.

References Cited in the file of this patent
UNITED STATES PATENTS
2,906,143   Musser _____ Sept. 29, 1959